United States Patent
Thibault

(10) Patent No.: US 8,531,304 B2
(45) Date of Patent: Sep. 10, 2013

(54) DEVICE AND METHOD FOR MEASURING MATERIAL LEVEL IN BIN USING FLEXIBLE RESISTANT MEMBERS

(75) Inventor: Ronald M. Thibault, Osborne, KS (US)

(73) Assignee: Osborne Industries Inc., Osborne, KS (US)

( * ) Notice: Subject to any disclaimer, the term of this patent is extended or adjusted under 35 U.S.C. 154(b) by 411 days.

(21) Appl. No.: 12/936,374

(22) PCT Filed: Apr. 25, 2008

(86) PCT No.: PCT/US2008/061679
§ 371 (c)(1),
(2), (4) Date: Oct. 4, 2010

(87) PCT Pub. No.: WO2009/123652
PCT Pub. Date: Oct. 8, 2009

(65) Prior Publication Data
US 2011/0025512 A1 Feb. 3, 2011

Related U.S. Application Data

(60) Provisional application No. 61/042,540, filed on Apr. 4, 2008.

(51) Int. Cl.
*G08B 21/00* (2006.01)
(52) U.S. Cl.
USPC .......................................... 340/614; 73/301
(58) Field of Classification Search
USPC ................. 340/603, 612, 614, 617; 73/301
See application file for complete search history.

(56) References Cited

U.S. PATENT DOCUMENTS

| 3,513,701 A | 5/1970 | Soltanoff |
| 3,629,946 A | 12/1971 | Parsons |
| 3,753,200 A | 8/1973 | Niejadlik |
| 3,912,954 A | 10/1975 | Baird |
| 4,043,199 A | 8/1977 | Greer |

(Continued)

FOREIGN PATENT DOCUMENTS

| FR | 2490813 | 3/1982 |
| GB | 716958 | 10/1954 |

OTHER PUBLICATIONS

Jowa Consilium, "Metritape Operation Principle & Products," www.consiliumus.com/Metritape.htm, 2008.

(Continued)

*Primary Examiner* — Jeffery Hofsass
(74) *Attorney, Agent, or Firm* — Jeffrey L. Thompson; Thompson & Thompson, P.A.

(57) ABSTRACT

A bin level monitoring system uses one or more monitoring devices (10) to measure a material (23) level in a bin (34). The monitoring devices (10) each have a frame (11) with at least two rigid frame members (12, 13) extending in a longitudinal direction with a space (14) between the frame members. A flexible material (22) covers the frame members (12, 13) and encloses the space (14) there between. A first resistive element (24) and a second resistive or conductive element (30) extend in the longitudinal direction of the device (10) and are arranged to move into contact with each other between the first and second frame members (12, 13) when pressure is applied by bulk material (23) in the bin (34) pressing against an outer surface of the flexible covering (22). An electric circuit (35) connected to the monitoring device (10) measures a total resistance of the free, non-contacted portion of at least one of the first and second elements (24, 30) to provide a measurement of the material level in the bin (34).

22 Claims, 13 Drawing Sheets

(56) References Cited

U.S. PATENT DOCUMENTS

| | | |
|---|---|---|
| 4,065,967 A | 1/1978 | Beeston |
| 4,107,994 A | 8/1978 | Sogo |
| 4,247,784 A | 1/1981 | Henry |
| 4,276,774 A | 7/1981 | McGookin |
| 4,807,471 A | 2/1989 | Cournane et al. |
| 5,233,352 A | 8/1993 | Cournane |
| 5,440,310 A | 8/1995 | Schreiner |
| 6,341,271 B1 | 1/2002 | Salvo et al. |
| 6,608,491 B2 | 8/2003 | Salmon, Jr. |
| 6,732,580 B2 | 5/2004 | Dirksen |

OTHER PUBLICATIONS

"Integra Integrated Management System, Feed-Link," Automated Production Systems, The GSI Group, Inc., Assumption, IL, 2006.

International Search Report from PCT/US2008/061679 dated Oct. 17, 2008.

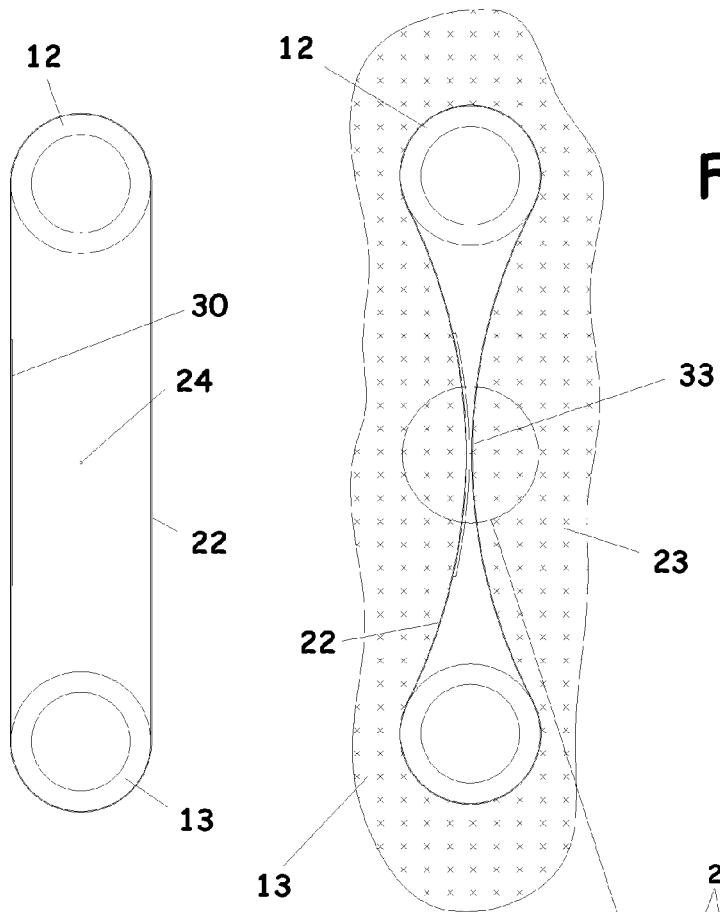
Fig. 9
Fig. 8
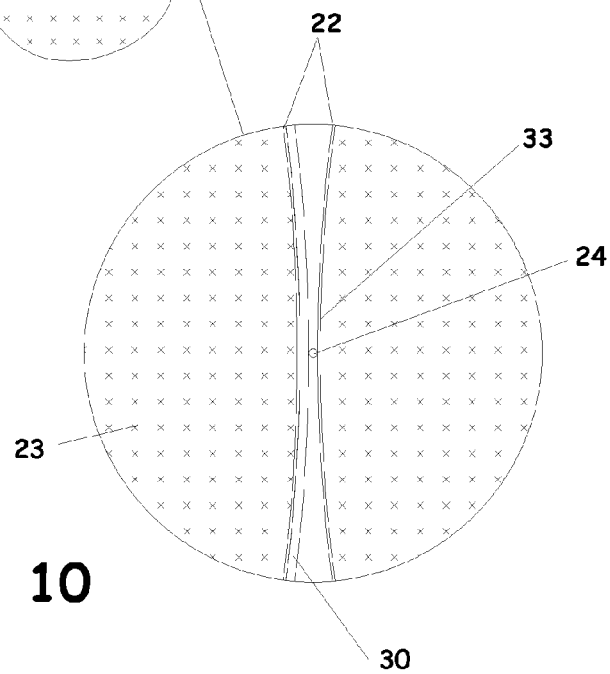
Fig. 10

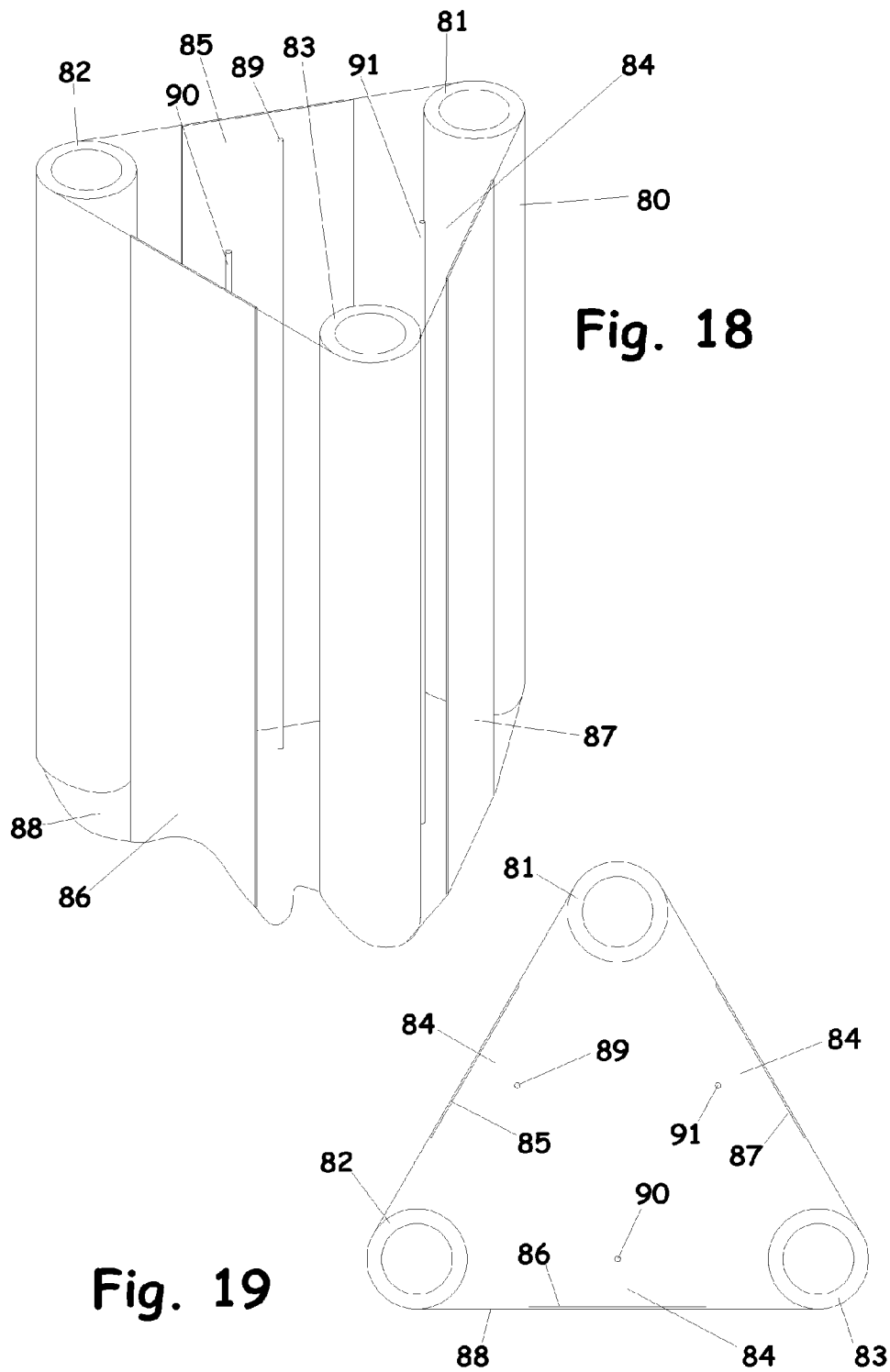

DEVICE AND METHOD FOR MEASURING MATERIAL LEVEL IN BIN USING FLEXIBLE RESISTANT MEMBERS

This application claims priority of U.S. Provisional Application No. 61/042,540 filed on Apr. 4, 2008. The content of this prior application is incorporated herein by reference.

TECHNICAL FIELD

The present invention relates generally to devices for measuring the depth of material in containers. In particular, the present invention relates to devices and methods for measuring the depth of dry bulk particulate materials, such as livestock feed, in a bin.

BACKGROUND ART

An ability to measure the level and amount of a dry bulk solid or a liquid or fluid level in a container is often needed to know the rate of use or disappearance of material from the container so that rate of material use can be accurately established to enable the user to monitor and control the use of the material being withdrawn from the container and to know when to restock the container with the material after it is predicted to be depleted. Such a measuring device also alerts an operator to avoid overfilling the container and can monitor the refilling operation to ensure that the container is totally filled, but not overfilled.

This requirement is particularly important for agricultural livestock feed bins which are frequently discharged and recharged with feed. Many ways have been developed for making this type of measurement, but all suffer from the problem of being inherently complicated and expensive to employ for low-added value applications like livestock feed, and even though expensive, are often unreliable in the harsh usage environments often found in rural locations where feed bins are employed.

There are several examples in the prior art of bin level measuring devices. For example, Parsons (U.S. Pat. No. 3,629,946) shows a mechanical method which lowers a bell weight on a cable while measuring the length of cable deployed to bring the bell weight into contact with a material upper surface. This electro-mechanical system employs a complex system of pulleys and sheaves to make measurements which must use moving parts that are subject to wear and damage and which are insensitive to low-density and irregular material surfaces. Measurements are discontinuous and periodic, so continuous level changes are not easily recognized.

Baird (U.S. Pat. No. 3,912,954) teaches how the use of an improved narrow-beam ultrasonic transducer can be used to measure the depth of material in a silo by timing reflections of the sound waves from the material surface. This method has been found to be unsuccessful and unreliable in the harsh conditions in which feed bins are used. Further, the reflectivity of variable, low-density feed materials compared to other reflective surfaces such as metal bin supports and sidewalls and complex reflections from such surfaces make this method unreliable.

Greer (U.S. Pat. No. 4,043,199) shows the use of a tube suspended within a silo. The material in the silo compresses the tube and thereby engages and supports a portion of a chain suspended within the tube. The weight of unsupported chain is measured and related proportionately to the total weight of chain to determine the length of supported chain and thereby the depth of material in the silo. This system is complex, relies on a mechanical weight measurement employing electromechanical moving parts, and gives a discontinuous measure of depth which is not easily automated and subject to large errors owing to the approximate nature of the weighing mechanism. McGookin (U.S. Pat. No. 4,276,774) uses a similar method of measuring the unsupported weight of a suspended cable within a silo using a load cell and associated mechanisms, but without the use of the guard tube taught by Greer. This method suffers from the same shortcomings of Greer and is impractical for many applications including livestock feed silos.

A plurality of temperature sensors and associated circuitry are used by Beeston (U.S. Pat. No. 4,065,967) to measure a non-uniform difference in temperature within a silo as a method to detect a discontinuous change in temperature caused by a material change from air to granulated material content. This method is complex and expensive to implement, and level measurements are easily confused by temperature changes that are unrelated to material level, and by the very small changes in temperature caused by low density and low conductivity materials like livestock feed. The method is not continuous, but potentially can increase the frequency of depth measurements by simply increasing the number of temperature sensors.

The damping of a vibrating plate by material in contact with the plate is taught by Sogo (U.S. Pat. No. 4,107,994) as a method to measure material level in a silo. Sogo shows two vibrating plate detectors at the top and bottom of the silo that are used to detect the full and empty condition. Sogo describes the advantages of a vibrating plate device as well as alternatives to this method. A multiplicity of vibrating plate devices might be used together with the detection means taught by Sogo to measure changes in the level of material in a silo in a discontinuous way, but the cost of the system would increase proportionately and require numerous undesirable openings in the sidewall of the bin.

A reflected light-beam triangulation method is taught by Henry (U.S. Pat. No. 4,247,784), but such a system requires optics and photo-detectors that are quickly contaminated in the dusty conditions of livestock feed silos. This method also requires reflective material and complicated and expensive detection and computing equipment to convert small changes in angles of reflections into a depth measurement. Therefore, this method is impractical for inexpensive and reliable feed silo measurement.

Cournane (U.S. Pat. No. 4,807,471) shows a depth measuring method using electrical reflections from an air-material interface within a silo. An electrical wave is created by a frequency generator and conducted by electrical conductors suspended in the silo that convey an alternating frequency electrical wave, which is partially reflected by the air-material interface. The reflected wave is detected by a sophisticated detection circuit and microprocessor and related to depth. Cournane (U.S. Pat. No. 5,233,352) extends this method with improvements, but the method is complex, potentially expensive, and impractical for application for livestock feed silos. Similarly, Schreiner (U.S. Pat. No. 5,440,310) shows a complex microwave radar system for level measurement which suffers from the same deficiencies for common applications like livestock feed silos.

Salvo (U.S. Pat. No. 6,341,271) teaches an inventory method for material held in silos, but does not explain how the contents of silos are to be continuously and automatically measured in any practical way. Salmon (U.S. Pat. No. 6,608,491) also shows a complex and expensive method for powering and detecting the position of a plurality of paddle sensors arrayed within a silo. The sensors are deflected by the load of material above each paddle so a discontinuous approximate location of the surface of the material in the silo can be known.

Dirksen (U.S. Pat. No. 6,732,580) shows a load cell that monitors the weight of a suspended cable within a silo. The cable is fitted with a terminal weight to increase the sensitivity of the cable/weight assembly to changes in support provided by the material in the silo. The change in weight measured by the load cell is related to the level of contents in the silo. In practice, this system is found to be unreliable, requires the use of an expensive load cell, and otherwise is relatively insensitive to low-density feeds. The load cell is also very vulnerable to lightning and static electricity, which are maintenance risks for this concept.

Others have used load cells under the three or four legs of bulk bins to measure the contents of bulk bins by weight directly. However, load cells are expensive, very vulnerable to lightning and static electricity, and require frequent maintenance by skilled personnel and have therefore not been widely adopted by livestock producers. Such a method also cannot be easily used for silos that are not elevated on legs.

A commercial measuring system sold under the product name, Meritape, by JOWA Consilium US, Inc., Littleton, Mass. 01460-1431, http://www.consiliumus.com, utilizes a resistance element similar to that in the present invention, as described at http://www.consiliumus.com/Metritape.htm. An envelope covers a conductive and a resistive element which are brought into contact by the compression of the envelope by hydrostatic pressure. These envelopes of protective material are formed with an inherent shape and tension bias that is distorted by the hydrostatic pressure. The change in resistance arising from the compression-caused electrical contact is converted into a depth measurement for fluid materials.

The construction used for Meritape works well for relatively dense materials like liquids with high internal pressure, but is not capable of measuring the depth for relatively low-density, dry-bulk materials like livestock feed with low internal pressure because these shaped unsupported envelopes are limited in size by the inherent shape and tension bias that can be attained by unsupported envelopes. These envelopes are not substantially distorted at achievable shapes by dry, bulk materials and are insensitive to low internal pressures of such materials as livestock feed.

DISCLOSURE OF INVENTION

The present invention provides a simple and low-cost method and device to measure and monitor the level of dry bulk solids in a bin, thereby solving the problems with the prior art systems described above.

Objects of the invention are to provide a device: that measures continuous changes in material depth for dry bulk materials in a silo, such as livestock feed with inherently low internal pressure; that has a construction that allows a tension and area of a flexible outer covering to be easily adjusted and modified for effective use with a wide variation of dry bulk particulate materials that have a range of low internal pressures and other properties; that can be assembled from linear subsections so that the final deployed device matches the total depth of a bin of any height; that can be combined as two or more bin level monitors connected in series to sample and report depths as an average of a number of locally variable depths in a bin; and that can be combined in a triangular array to measure material level in three directions within a bin and to measure a wider range of internal pressures for better accuracy.

The invention can use one conductor and one opposed resistive wire (or spirally wound resistive wire) element, or one conductive film and one resistive film, or two opposed and uniformly deformable resistive film elements, to provide a variable resistive contact-circuit with resistance inversely proportional to the depth of material in a bin.

The present invention provides a method of measuring the depth of material in a bin in a way that is simple to measure, read, transmit, report, and convert as information that can be collected by a microprocessor or computer from a plurality of bins.

To accomplish these and other objects of the present invention, a bin level monitoring system is provided that uses one or more monitoring devices to measure a material level in a bin. The monitoring devices each have a frame with at least two rigid frame members extending in a longitudinal direction with a space between the frame members. A flexible material covers the frame members and encloses the space between the frame members to form a flexible outer covering. A first resistive element and a second resistive or conductive element extend in the longitudinal direction of the device and are arranged to move into contact with each other between the first and second frame members when pressure is applied by dry bulk particulate material in the bin pressing against an outer surface of the flexible outer covering. An electric circuit connected to the monitoring device measures a total resistance of a free, non-contacted portion of at least one of the first and second elements to provide a measurement of the material level in the bin.

Numerous other objects of the present invention will be apparent to those skilled in this art from the following description wherein there are shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF DRAWINGS

The present invention will become more clearly appreciated as the disclosure of the present invention is made with reference to the accompanying drawings. In the drawings:

FIG. 8 is a cross section view of the bin level monitoring device in a non-contacted condition.

FIG. 9 is a cross section plan view of the bin level monitoring device, with an external force applied to the flexible outer covering to cause the conductive film to contact the resistive element.

FIG. 10 is a detail view of a portion of the bin level monitoring device shown in FIG. 9.

FIG. 18 is a perspective view of a bin level monitoring device according to another embodiment of the invention in which three parallel frame members are arranged in a triangular configuration.

FIG. 19 is a plan view of the bin level monitoring device shown in FIG. 18.

BEST MODES FOR CARRYING OUT THE INVENTION

Figure 1:
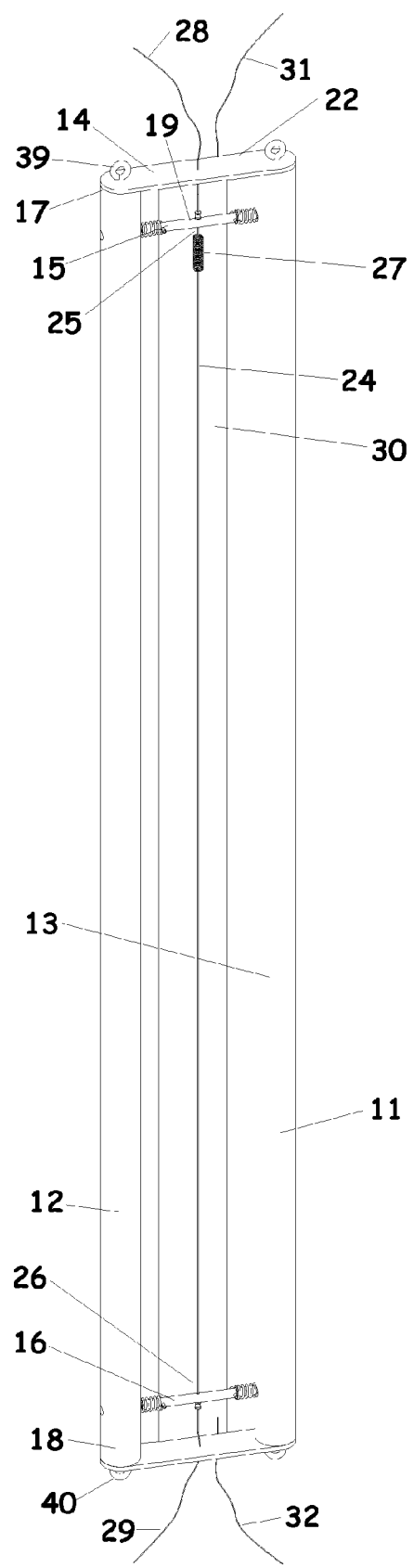
FIG. 1 is a perspective view of a bin level monitoring device according to the present invention.

A bin level monitoring device, method and system according to the present invention will now be described in detail with reference to FIGS. 1 to 19 of the accompanying drawings.

The present invention utilizes a concept that is responsive to low-density dry bulk particulate materials and enables the depth of such materials to be measured accurately and continuously for any height of bin using the change in resistance that arises from compressive contact between resistive and conductive elements.

As shown in FIGS. 1 to 4, the bin level monitoring device 10 has a frame 11 comprising first and second rigid frame members 12, 13 that extend in a longitudinal direction of the device 10 with a space 14 between the two frame members 12, 13. The frame members 12, 13 are kept separated by respective spring-loaded separator assemblies 15, 16 located near the upper and lower ends 17, 18 of the frame 11. Each spring-loaded separator assembly 15, 16 includes a support rod 19 that extends through respective holes in the frame members 12, 13 for slidable movement relative to the frame members 12, 13. Compression springs 20 are placed over each end of the support rods 19 and are held in place by roll pins 21 extending through the support rods 19. The compression springs 20 are arranged to apply a spring force to bias the frame members 12, 13 away from each other. The amount of the spring force can be adjusted by varying the spring constant, spring length, and spring compression of the springs 20.

A flexible material over-covers the frame members 12, 13 and encloses the space 14 between the frame members 12, 13 to form a flexible outer covering 22. The flexible material can be any modestly elastic film material, such as polyethylene, polyvinylchloride, rubber, elasticized woven cloth, and the like. The material and thickness of the flexible material are selected to be suitably durable for the type of dry bulk material 23 to be measured. For example, a six mil polyethylene film is used in the illustrated embodiment. The flexible outer covering 22 can be heat sealed to enclose and seal the frame 11 and other components of the bin level monitoring device 10. In this embodiment, the frame 11 and separator assemblies 15, 16 are fully enclosed by the flexible outer covering 22 and inaccessible to the user, but are also shielded and protected from contamination from dust or corrosive contact with the dry bulk materials 23.

A first resistive element 24 extends in the longitudinal direction of the device 10 within the space 14 enclosed by the flexible outer covering 22. The resistive element 24 in the embodiment shown in FIGS. 1 to 4 is a resistive wire connected at its upper and lower ends 25, 26 to the upper and lower support rods 19, respectively. The resistive element 24 can be any suitable resistive wire, such as a straight nickel-chromium wire. Alternatively, a uniformly distributed and spirally wound wire supported by an insulated core, such as fiberglass cord or plastic rod or some similar construction, can be used as the resistive wire 24. An extension spring 27 is provided to maintain tension on the resistive wire 24. Connect wires 28, 29 are connected to the resistive element 24 and extend from the upper and lower ends of the device 10 for connecting to an electric circuit (or to other modular units, as described below).

A second conductive element 30 extends in the longitudinal direction of the device 10 within the space 14 enclosed by the flexible outer covering 22. The conductive element 30 in the embodiment shown in FIGS. 1 to 4 is an internal film conductor, such as aluminum foil, adhered to the interior surface of the flexible outer covering 22 on a side facing the resistive element 24. Alternatively, the conductive element 30 can be a conductive evaporated, painted, or etched metal foil or the like on the inside of the flexible outer covering 22. Connect wires 31, 32 are connected to the conductive element 30 and extend from the upper and lower ends of the device 10 for connecting to an electric circuit (or to other modular units, as described below).

The conductive element 30 is arranged to move into contact with the resistive element 24 in the space 14 between the first and second frame members 12, 13 when pressure is applied against the outer surface of the flexible outer covering 22. The length of the portion 33 of the resistive element 24 contacted by the conductive element 30 provides a measurable resistance value indicative of the level of dry bulk solid material 23 in the bin 34. The resistive and conductive elements 24, 30 are arranged so that the contacted portion 33 can be varied in length continuously in response to changes in pressure applied to the flexible outer covering 22 as the level of the dry bulk material 23 in the bin 34 changes.

The flexible outer covering 22 is maintained taut by the spring separator assemblies 15, 16 between the frame members 12, 13. The spring force applied by the spring separator assemblies 15, 16 can be selected to suit the type of dry bulk material 23 that is to be measured and monitored by the device 10.

The resistance of the resistive element 24 in the bin level monitoring device 10 is measured by a Wheatstone bridge circuit 35 connected to the wires 28, 31 extending from the upper end of the device 10. The bridge circuit 35 and system layout are shown conceptually in FIG. 17. The bridge circuit 35 continuously reads and reports the total resistance of the free, non-contacted portion of the resistive element 24. The resistance measurement is inversely and linearly related to the depth of the material 23 in the bin 34. The bridge circuit 35 can be battery or solar powered for convenient installation at remote bin sites.

The resistance measurement from the bridge circuit 35 can be converted into a proportionate voltage or digital value indicative of the material level in the bin 34, which can then be transmitted by wireless radio or by an electrical connection to a receiver 36 associated with a microprocessor or computer 37. A plurality of bin level monitor devices 10 can be continuously monitored in this way by a central processor 37. The central processor 37 converts the signal received from the bridge circuit(s) 35 from one or more bins 34 into depth or volume data and communicates with a feed mill 38 for resupply. The methods for measuring, reading, transmitting, reporting, and converting a resistance value into a bin depth value or volume are all well known to anyone skilled in the electronics art.

The invention creates a bin level monitor with a large area, supported flexible outer covering 22 with adjustable surface tension to enable controlled deflection of a conductor 30 under the low internal pressure of dry bulk particulate solids 23 like livestock feed. When the dry bulk particulate solid material 23 contacts and presses against the outer surface of the flexible outer covering 22, the conductor element 30 deflects into contact with the central resistive element 24. The resistive element 24 is kept straight and taut under tension by the extension spring 27.

Figure 2:
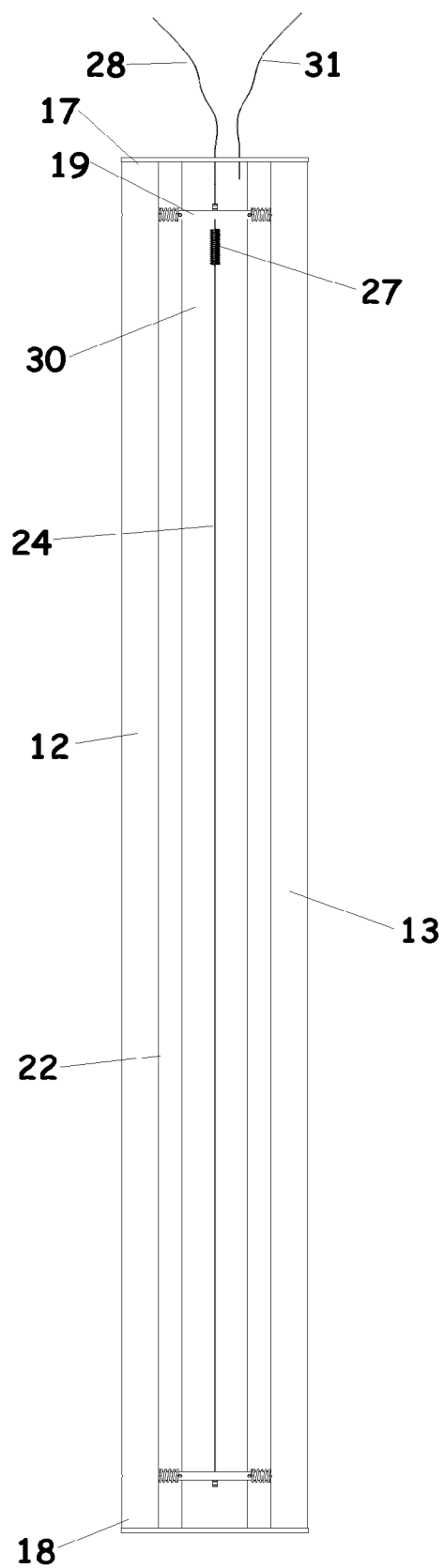
FIG. 2 is an elevation view of the bin level monitoring device shown in FIG. 1.
Figure 3:
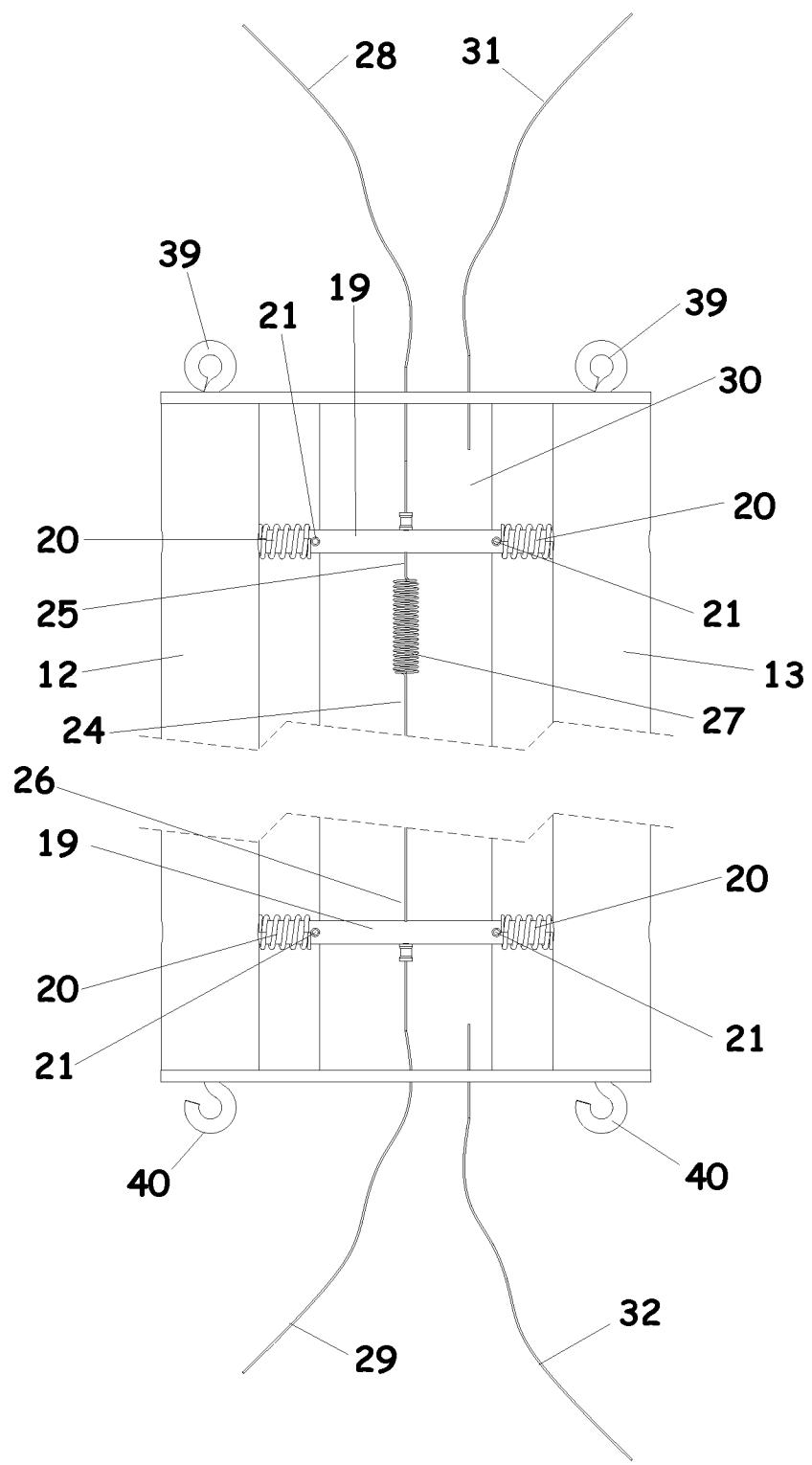
FIG. 3 is an enlarged detail view of the upper and lower ends of the bin level monitoring device.
Figure 4:
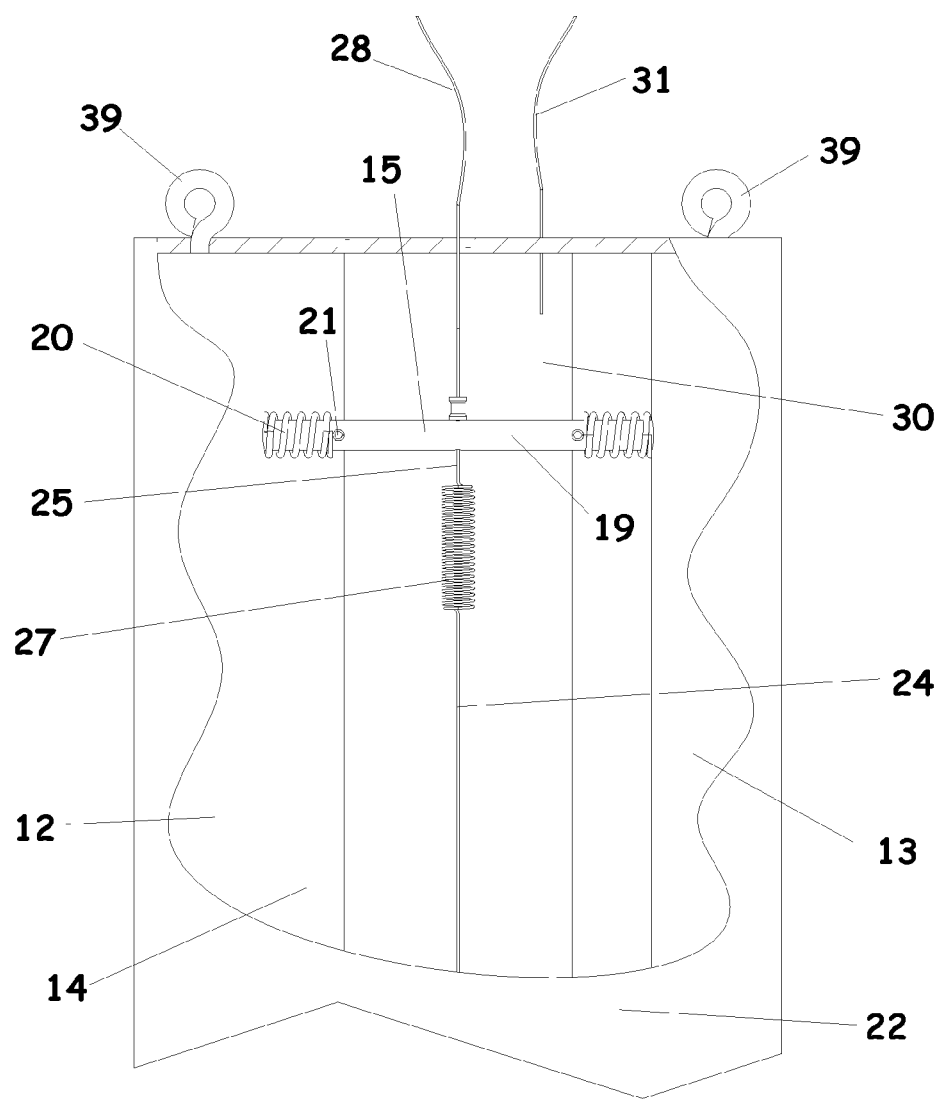
FIG. 4 is a cutaway detail view of the upper end of the bin level monitoring device.
Figure 5:
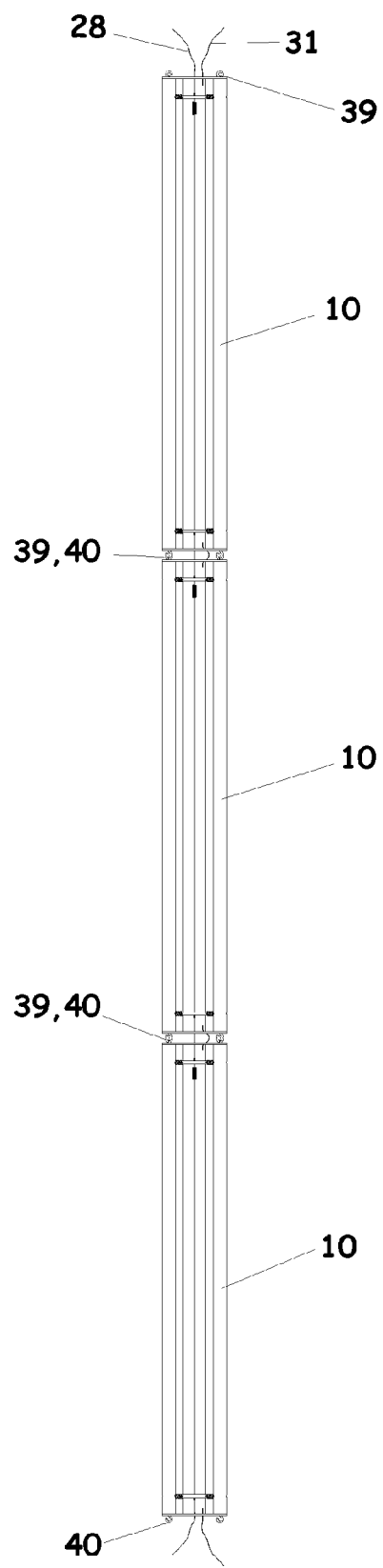
FIG. 5 is an elevation view showing a plurality of bin level monitoring devices connected together end-to-end.
Figure 16:
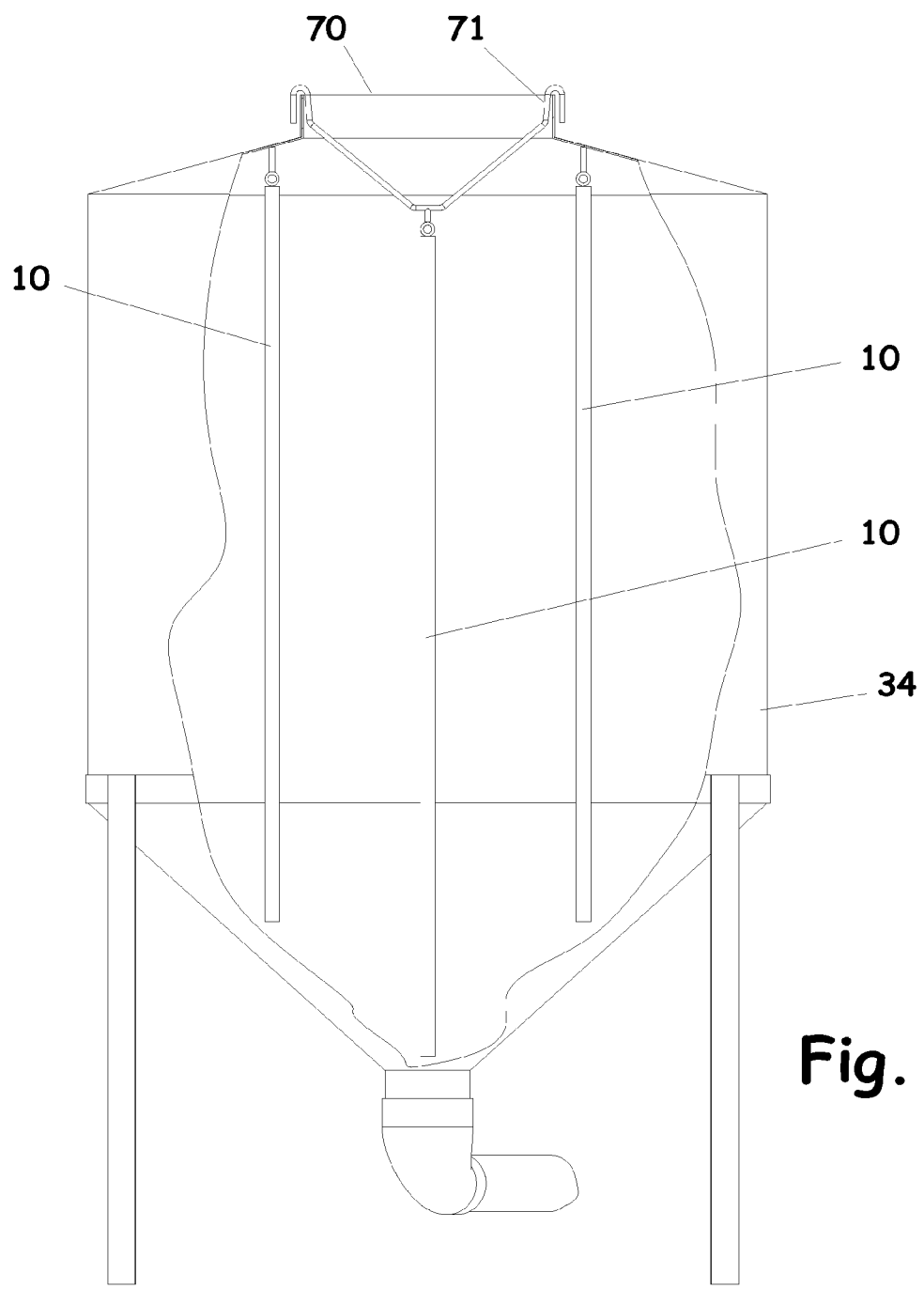
FIG. 16 is a cutaway elevation view of a bin equipped with a bin level monitoring system of the present invention.
Figure 17A:
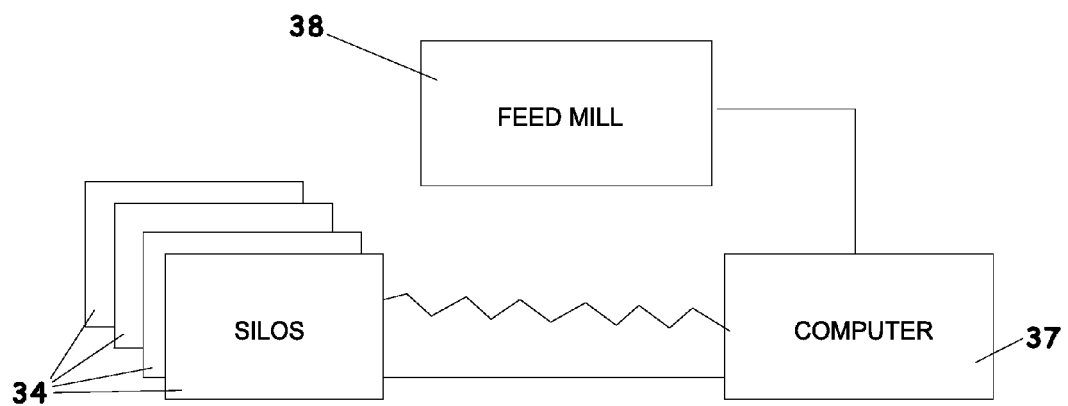
FIGS. 17(a) and 17(b) are diagrams of a feed bin level monitoring system according to the present invention.
Figure 17B:
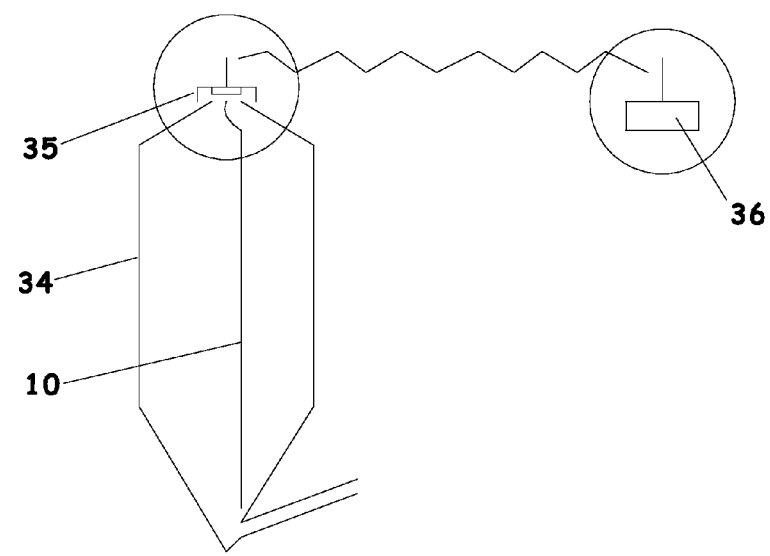

The bin level monitoring system of the present invention can be made as one continuous construction of a monitoring device 10 having a length that is equivalent to the height of the bin 34, as shown in FIGS. 2 and 16. Alternatively, the bin level monitoring system can be made of shorter sections that can be attached together end-to-end for a total length that matches the height of the bin 34, as shown in FIG. 5. The devices 10 can be provided with connecting structures, such as the top connecting eyes 39 and bottom connecting hooks 40 shown in FIG. 3, to facilitate attaching multiple sections together. By using short sections that can be attached together, the system can be more easily shipped and assembled on-site and can easily adapt to a range of bin depths. The combination of several sections of monitoring devices 10 can be connected electrically in a serial resistive circuit.

The frame members 12, 13 can be made of any suitably rigid material, such as wood, fiberglass, steel, or other material, or, as in the present embodiment, plastic conduit pipe. The diameter of the pipe is chosen so that the width of the flexible outer covering 22 and the force of the spring separator assemblies 15, 16 create a combination of deflection distance and tension force consistent with the bulk density and internal pressure of the dry bulk material 23 being monitored. The dimensions of the device 10 and tension force of the spring assemblies 15, 16 can be selected to enable deflection and contact between the conductive element 30 and the resistive element 24 upon contact by the dry bulk material 23 being monitored.

For example, to increase the amount of deflection force, the distance between the two frame members 12, 13 and thereby the width of the flexible outer covering 22 can be increased to expose more area to the internal pressure of the dry bulk material 23. To counter the deflection force and to restore the flexible outer covering 22 to its undistorted configuration and interrupt the contact condition between the central resistive element 24 and the conductive element 30 when internal pressure vanishes as the level of the dry bulk material 23 drops and exposes additional length of the bin level monitoring device 10, the spring tension on the spring separator assemblies 15, 16 can be increased.

Figure 6:
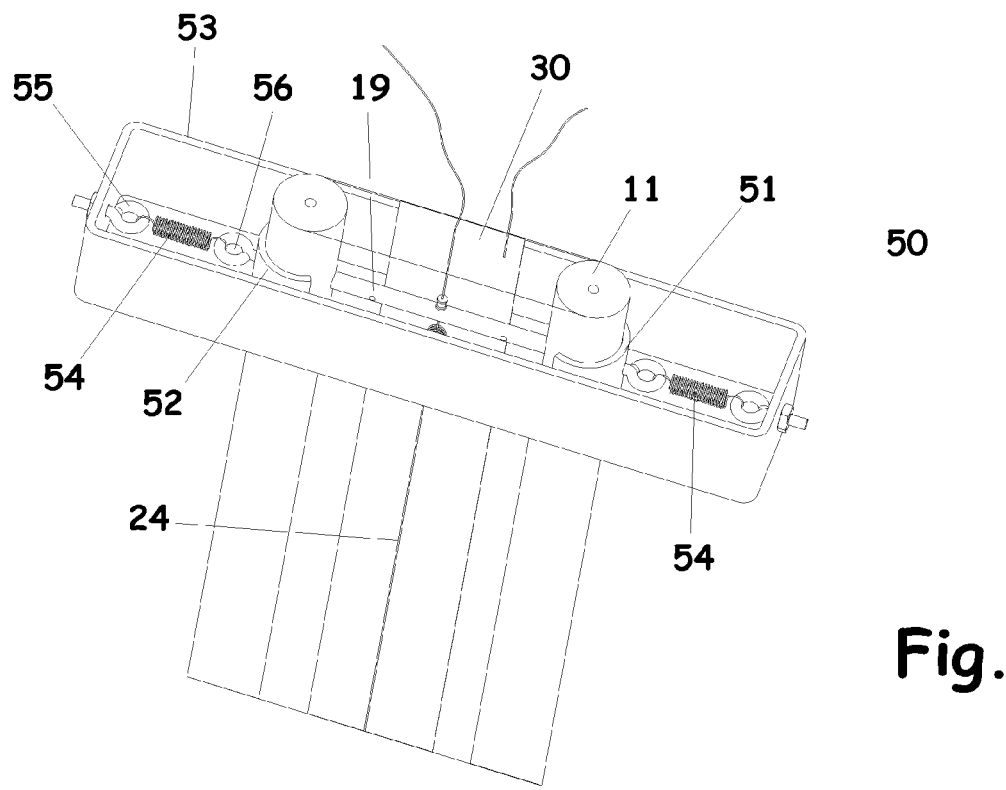
FIG. 6 is a perspective view of an upper end of a bin level monitoring device having an external tensioner.
Figure 7:
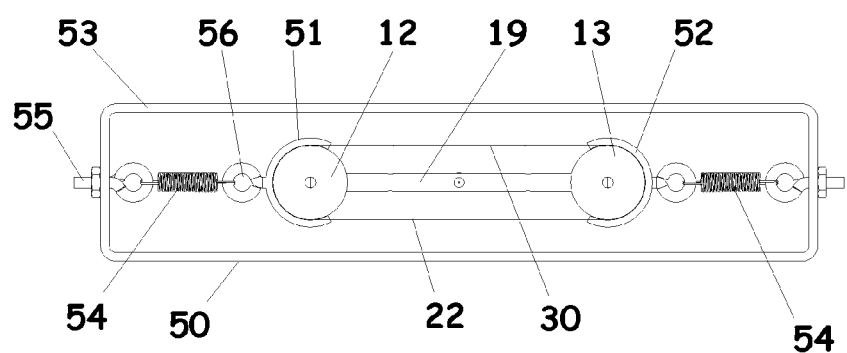
FIG. 7 is a plan view of the upper end of the bin level monitoring device shown in FIG. 6.
Figure 11:
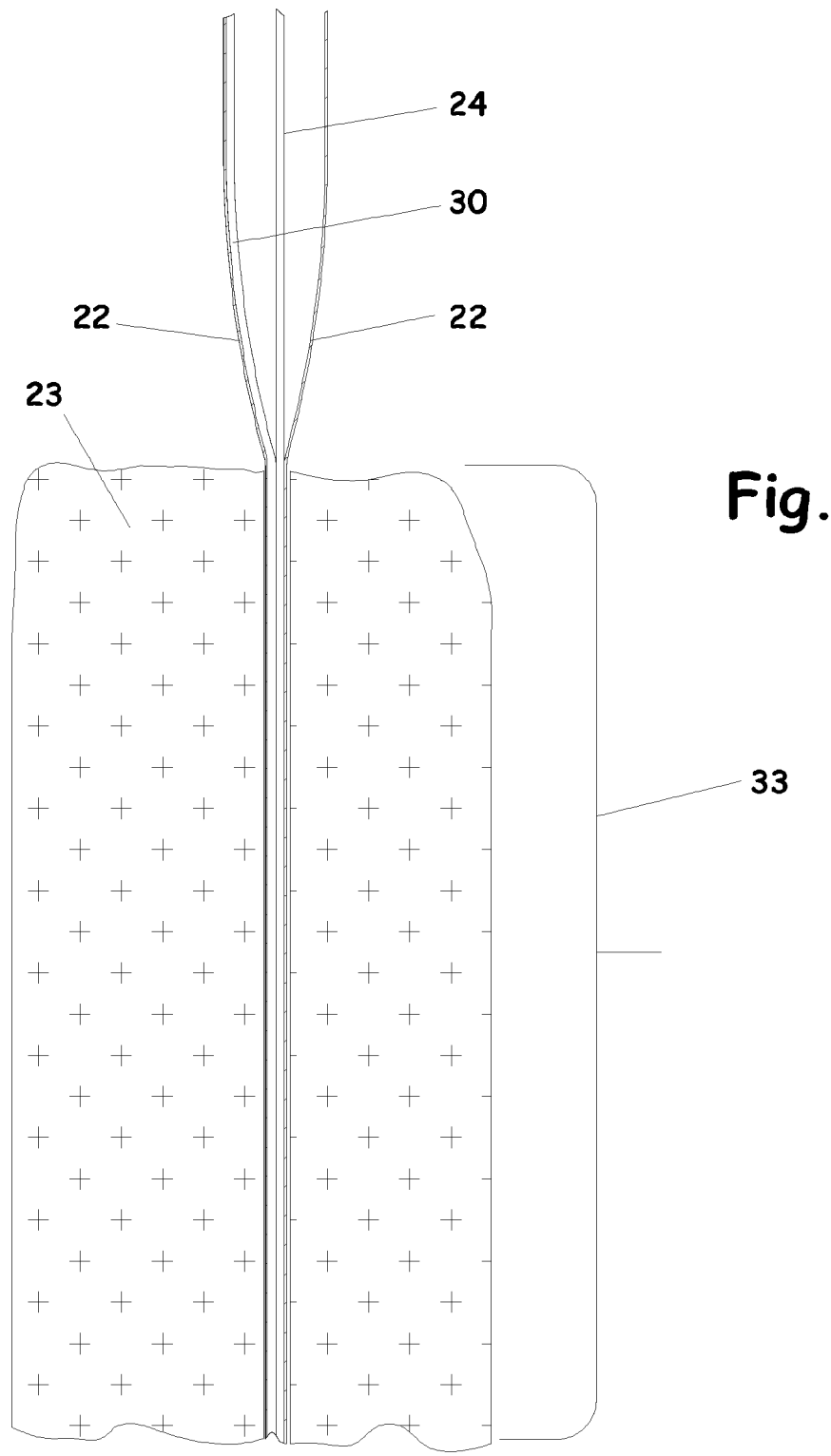
FIG. 11 is a cross section side view of the bin level monitoring device showing contact between the resistive element and the conductive film along a portion of the device contacted by dry bulk particulate material within a bin.
Figure 12:
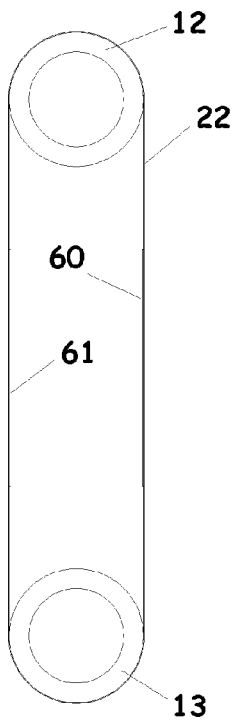
FIG. 12 is a cross section plan view of a bin level monitoring device according to another embodiment of the present invention in which a first resistive film and a second resistive or conductive film are provided on the inner surface of the flexible outer covering.
Figure 13:
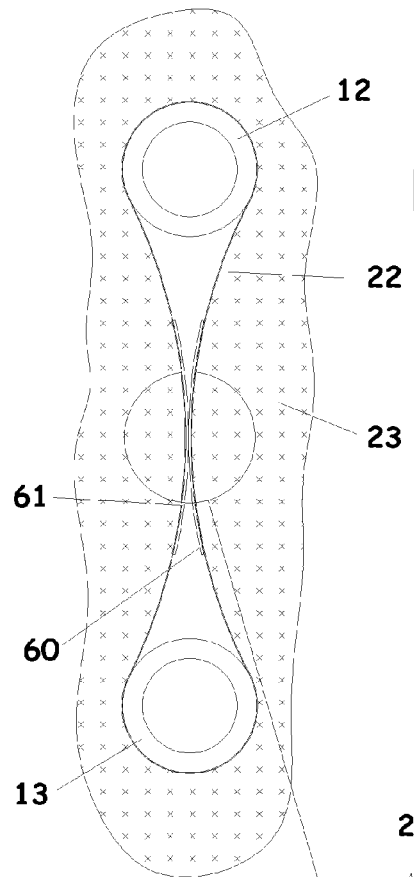
FIG. 13 is a cross section plan view of the bin level monitoring device shown in FIG. 12, with an external force applied to the flexible outer covering to cause the first film to contact the second film.
Figure 14:
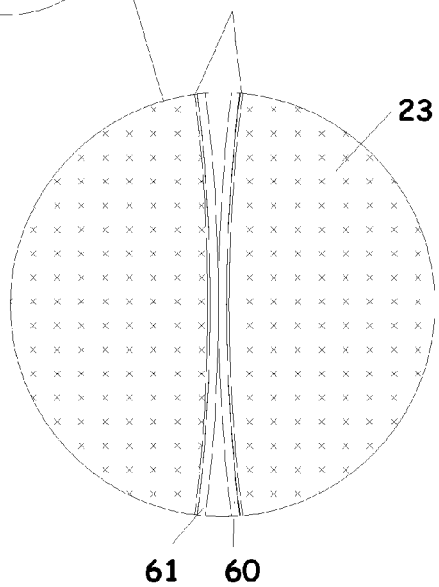
FIG. 14 is a detail view of a portion of the bin level monitoring device shown in FIG. 13.
Figure 15:
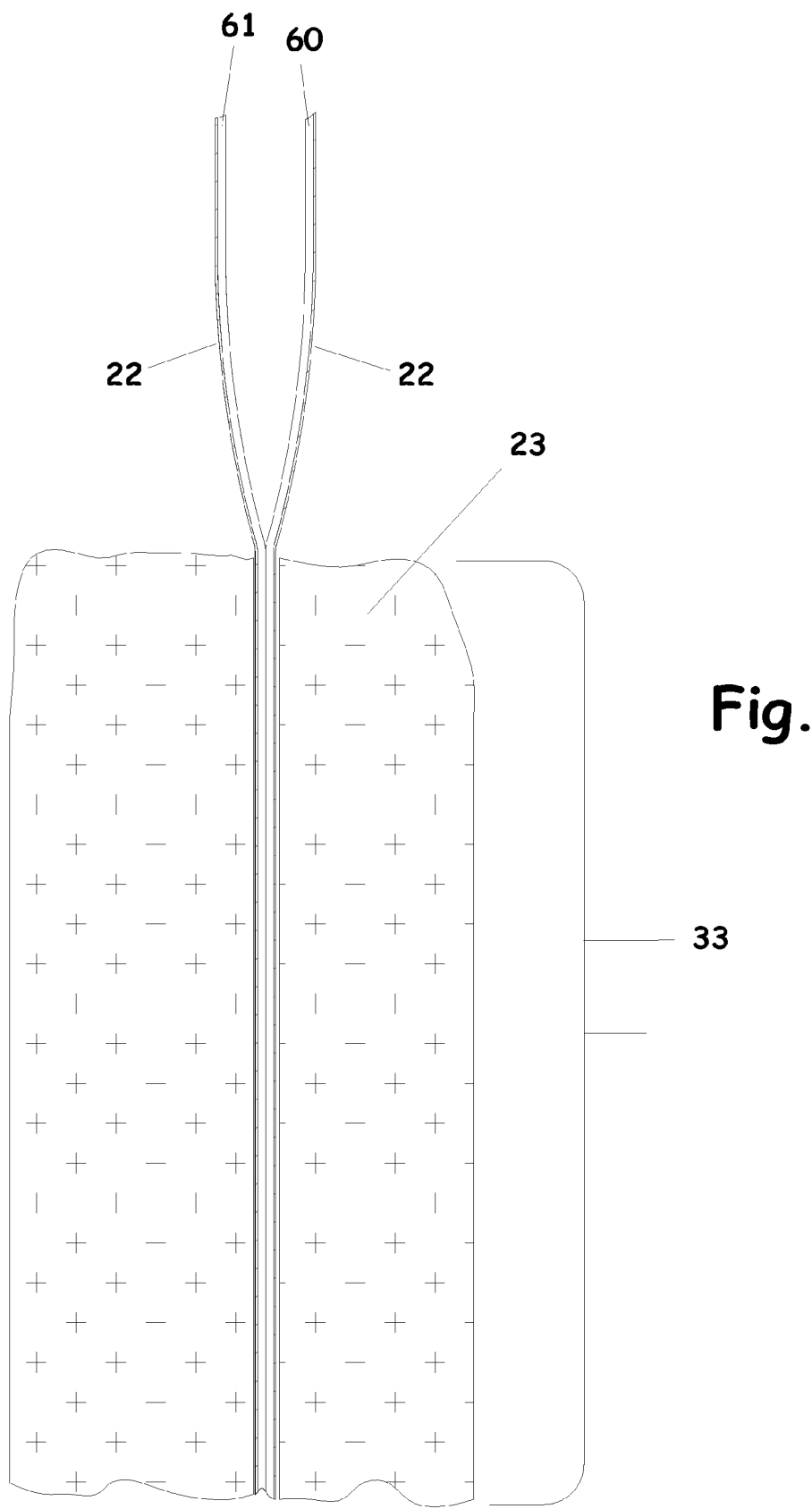
FIG. 15 is a cross section side view of the bin level monitoring device shown in FIG. 12, showing contact between the first and second films along a portion of the device contacted by dry bulk particulate material within a bin.

An alternative construction is shown in FIGS. 6 and 7 in which the frame 11 and flexible outer covering 22 are kept taut by an external adjustable tensioning separator assembly 50. The external separator assembly 50 is connected to the outside of the frame members 12, 13 using pipe clamps 51, 52 or other suitable gripping structures. A support structure 53 surrounds the frame 11, and tension springs 54 are connected via eye bolts 55, 56 between the support structure 53 and the respective sides of the frame 11. The eye bolts 55 connecting the tension springs 54 to the support structure 53 can be adjusted in length to change the spring tension applied to the frame 11. A plurality of external separator assemblies 50 can be used as needed to create uniform and appropriate tension on the flexible outer covering 22 to enable deflection and also restoration of separation as the bin level monitoring device 10 projects above the level of the dry bulk material 23.

Another alternative construction is shown in FIGS. 12 to 15 in which the central resistive wire is eliminated and two internal film elements 60, 61 are used rather than the one conductor film on the inside of the flexible outer covering 22. The two film elements 60, 61 are adhered to the interior surfaces of the flexible outer covering 22 on opposite sides of the space 14 between the two frame members 11, 12 to face each other. Either one or both of these two internal film elements 60, 61 can be electrically resistive. As in the first embodiment described above, the internal pressure of the dry bulk material 23 distorts the flexible outer covering 22 until the two internal film elements 60, 61 are pressed together in the space 14 between the two frame members 11, 12 to complete the circuit with a resistance that is inversely proportional to the depth of the dry bulk material 23 in the bin 34.

A single bin level monitoring device 10 or a system of two or more devices that are linked mechanically and electrically at the site of use can be deployed through a top entry 70 into the bin 34, as shown in FIG. 16. The devices 10 can be mechanically suspended from the top of the bin in any of several ways, such as fastening to the top interior of the bin or to the edge of the entry to the bin using a hanger 71. Two or more bin level monitor devices 10 can be suspended and connected electrically in series to measure an average of several levels from multiple locations within the bin 34 if the bin 34 is large or the exit flow of the material 23 in the bin 34 is known to be uneven.

An alternative embodiment of the bin level monitoring device 80 is shown in FIGS. 18 and 19. In this embodiment, a triangular array of three rigid frame members 81, 82, 83 are arranged parallel with each other and extend in a longitudinal direction of the device 80 with spaces 84 between each of the frame members 81-83. Three conductive film elements 85, 86, 87 are adhered to the interior surfaces of the flexible outer cover 88 on three sides of the device 80, and three resistive elements 89, 90, 91 are arranged within the respective spaces 84 between the frame members 81-83 to oppose the conductive film elements 85-87. This construction provides a device 80 with three conductor-containing sides that can receive pressure from the volume of dry bulk material 23 in a bin 34 from three different directions.

While the invention has been specifically described in connection with specific embodiments thereof, it is to be understood that this is by way of illustration and not of limitation, and the scope of the appended claims should be construed as broadly as the prior art will permit.

What is claimed is:

1. A bin level monitoring device, comprising:
   a first resistive element extending in a longitudinal direction of the device;
   a second resistive or conductive element extending in the longitudinal direction of the device, said first and second elements being arranged to move into contact with each other;

a frame comprising at least two rigid frame members extending in the longitudinal direction with a space between the frame members;

a flexible material covering the frame members and enclosing the space between the frame members to provide a flexible outer covering;

said first and second elements being arranged to move into contact with each other in the space between the first and second frame members to provide a contacted portion indicative of material level in a bin upon pressure being applied against an outer surface of the flexible outer covering; and a spring separator means for applying a spring force to bias the two rigid frame members away from each other.

2. The bin level monitoring device according to claim 1, wherein said first and second elements are arranged such that the contacted portion can be varied in length continuously in response to changes in pressure applied to the flexible outer covering as the material level in a bin changes.

3. The bin level monitoring device according to claim 2, further comprising an electric circuit connected to the first and second elements, said circuit comprising a means for continuously measuring a total resistance of the free, non-contacted portion of at least one of the first and second elements to provide a measurement of material level in a bin.

4. The bin level monitoring device according to claim 3, wherein said circuit is a variable resistive contact circuit with resistance inversely proportional to a depth of material in a bin.

5. The bin level monitoring device according to claim 1, wherein said flexible outer covering and frame are constructed so as to allow the first and second elements to move into contact with each other upon pressure being applied by dry bulk solids against the outer surface of the flexible outer covering.

6. The bin level monitoring device according to claim 1, wherein said spring separator means comprises a means for adjusting the spring force to change the amount of pressure required to move the first and second elements into contact with each other.

7. The bin level monitoring device according to claim 1, wherein said spring separator means comprises a first spring assembly arranged to bias first ends of the two rigid frame members away from each other and a second spring assembly arranged to bias second ends of the two rigid frame members away from each other.

8. The bin level monitoring device according to claim 7, wherein said first and second spring assemblies comprise compression springs arranged between the two rigid frame members.

9. The bin level monitoring device according to claim 7, wherein said first and second spring assemblies comprise adjustable, spring-loaded separator elements arranged outside of the frame.

10. The bin level monitoring device according to claim 1, wherein said first element is a resistive wire extending in the longitudinal direction of the device within the space between the frame members.

11. The bin level monitoring device according to claim 10, wherein said second element is an internal film conductor adhered to an interior surface of the flexible outer covering on a side thereof facing said first element.

12. The bin level monitoring device according to claim 1, wherein said first element is a resistive film adhered to an interior surface of the flexible outer covering on a side thereof facing the space between the frame members, and said second element is a resistive film adhered to an interior surface of the flexible outer covering on an opposite side of the space between the frame members to face the first element.

13. The bin level monitoring device according to claim 1, wherein said first element is a resistive film adhered to an interior surface of the flexible outer covering on a side thereof facing the space between the frame members, and said second element is a conductive film adhered to an interior surface of the flexible outer covering on an opposite side of the space between the frame members to face the first element.

14. A bin level monitoring device, comprising:
a first resistive element extending in a longitudinal direction of the device;
a second resistive or conductive element extending in the longitudinal direction of the device, said first and second elements being arranged to move into contact with each other;
a frame comprising at least two rigid frame members extending in the longitudinal direction with a space between the frame members;
a flexible material covering the frame members and enclosing the space between the frame members to provide a flexible outer covering; and
said first and second elements being arranged to move into contact with each other in the space between the first and second frame members to provide a contacted portion indicative of material level in a bin upon pressure being applied against an outer surface of the flexible outer covering;
wherein said at least two frame members comprises three frame members arranged generally parallel with each other in a triangular array and extending in a longitudinal direction of the device with spaces between each of the frame members, and wherein said first and second elements comprise three sets of first and second elements arranged to provide respective contacted portions indicative of material level in a bin upon pressure being applied against the outer surface of the flexible outer covering in three different directions.

15. The bin level monitoring device according to claim 1, further comprising a means for connecting a plurality of said devices together end-to-end in series to accommodate different bin heights.

16. The bin level monitoring device according to claim 1, wherein said flexible outer covering comprises a durable elastic film material that over-covers the frame members and encloses the space between the frame members.

17. The bin level monitoring device according to claim 16, wherein said film material is a polyethylene film.

18. A bin level monitoring system, comprising:
at least one monitoring device comprising:
a first resistive element extending in a longitudinal direction of the device;
a second resistive or conductive element extending in the longitudinal direction of the device, said first and second elements being arranged to move into contact with each other;
a frame comprising at least two rigid frame members extending in the longitudinal direction with a space between the frame members;
a flexible material covering the frame members and enclosing the space between the frame members to provide a flexible outer covering; and
said first and second elements being arranged to move into contact with each other in the space between the first and second frame members to provide a contacted portion indicative of material level in a bin upon pressure being applied against an outer surface of the flexible outer covering; and an electric circuit connected to said at least one monitoring device, said circuit comprising a means for continuously measuring a total resistance of the free, non-contacted portion of at least one of the first and second elements to provide a measurement of material level in a bin;

wherein said at least one monitoring device comprises a spring separator means for applying a spring force to bias the two rigid frame members away from each other.

19. The bin level monitoring system according to claim 18, wherein said at least one monitoring device comprises a means for hanging the device within a bin to be monitored, and wherein said first and second elements are arranged such that the contacted portion can be varied in length continuously in response to changes in pressure applied to the flexible outer covering as the material level in the bin changes.

20. The bin level monitoring system according to claim 18, wherein said circuit is a variable resistive contact circuit with resistance inversely proportional to a depth of material in a bin.

21. The bin level monitoring system according to claim 18, wherein said at least one monitoring device comprises a plurality of monitoring devices connected together end-to-end in series.

22. The bin level monitoring system according to claim 18, wherein said at least one monitoring device comprises a plurality of said monitoring devices connected together in series to provide an average bin level measurement from multiple locations within the bin.

* * * * *